Dec. 6, 1932.  H. A. EDWARDS  1,890,249
SAUSAGE PREPARING APPARATUS
Filed May 11, 1929   2 Sheets-Sheet 2
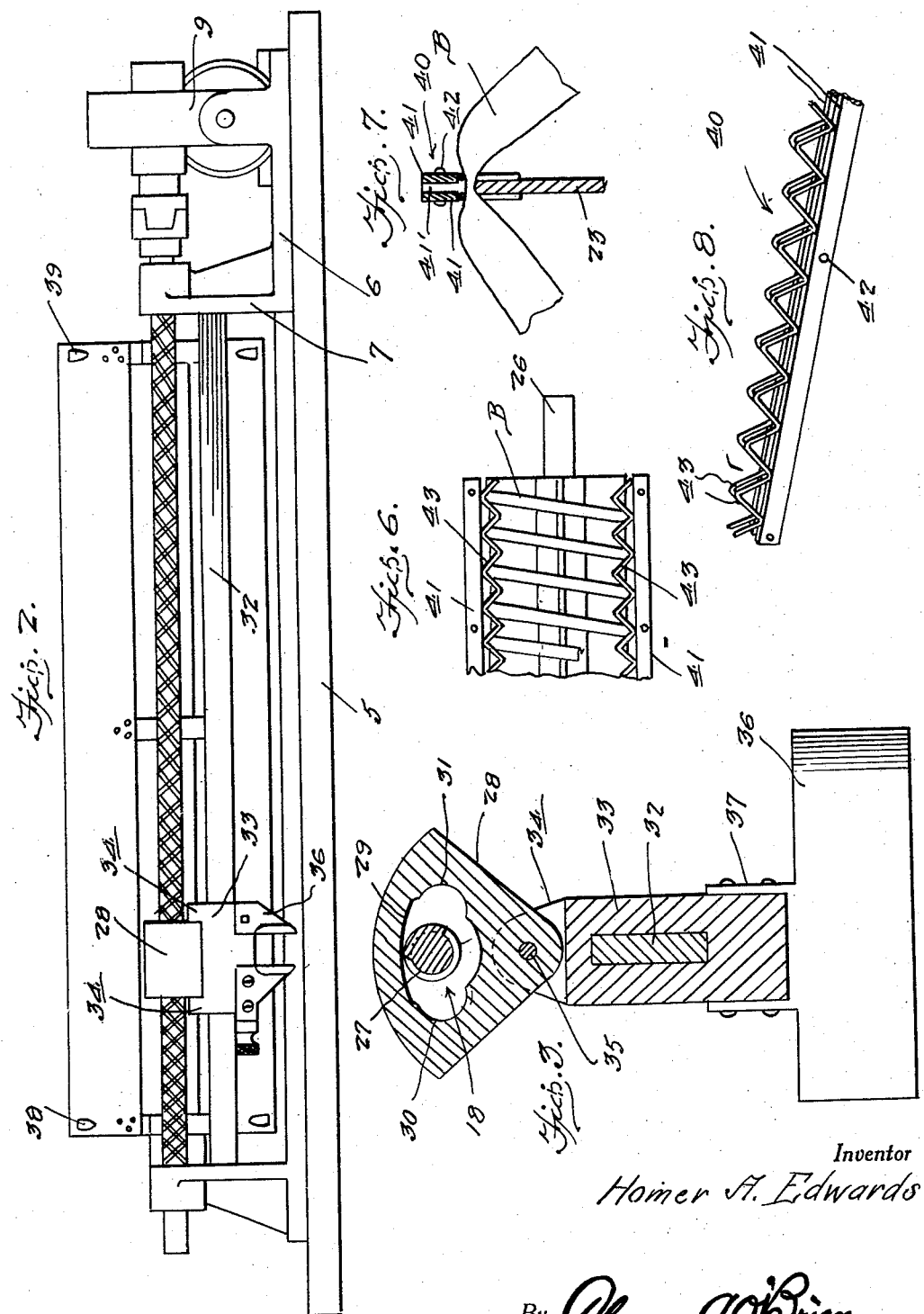
Inventor
Homer A. Edwards
By Clarence A. O'Brien
Attorney Patented Dec. 6, 1932

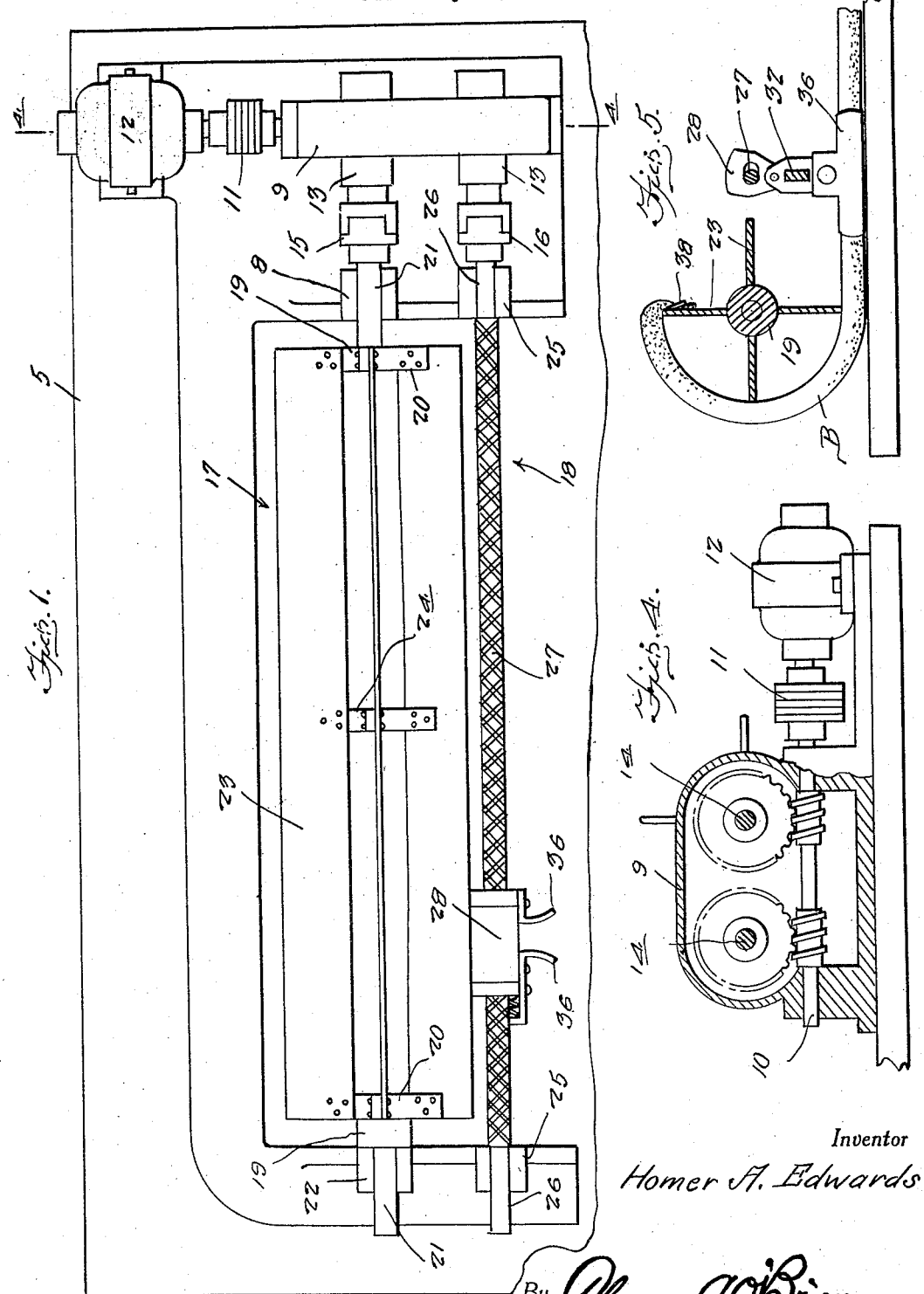

1,890,249

UNITED STATES PATENT OFFICE

HOMER A. EDWARDS, OF NAMPA, IDAHO

SAUSAGE PREPARING APPARATUS

Application filed May 11, 1929. Serial No. 362,439.

The present invention appertains to a novel method and apparatus for preparing sausage of uniform length for smoking, and more particularly to a machine for crimping and supporting the sausage string during the smoking thereof, in a manner whereby all portions of the sausage string may be thoroughly smoked at a single exposure.

The prime object of the invention is to provide an apparatus of the character mentioned which in operation will be efficient and positive acting, and which confines a plurality of heretofore independent mechanisms in a single special machine.

Another important object of the invention is to provide a compact machine of the character mentioned which will cost less to manufacture than the independent devices heretofore necessary in the operation of preparing string sausage for smoking.

These and numerous other objects of the invention will become more apparent to the reader after considering the invention as described and claimed hereinafter.

In the drawings:—

Figure 1 represents a top plan view of the novel machine.

Fig. 2 is a side elevation of the machine.

Fig. 3 represents a vertical sectional view through the guide portion of the invention.

Fig. 4 represents a transverse sectional view through the driving means for the apparatus.

Fig. 5 represents a vertical sectional view through the apparatus showing a sausage string started thereon.

Fig. 6 represents a fragmentary side elevation of the reel and showing a sausage string convoluted thereon and engaged by the crimper.

Fig. 7 represents a fragmentary vertical sectional view showing the crimper engaged with a sausage on the reel.

Fig. 8 represents a fragmentary perspective view of one of the crimpers.

Referring to the drawings wherein like numerals designate like parts, it will be seen that the invention includes a base 5 upon one end of which is mounted a casting 6 formed to provide a post 7 supporting a bearing 8 and a housing 9. The latter supports a shaft 10 connected as at 11 to the armature shaft of an electric motor 12, also mounted upon the base 5. The housing 9 is provided with transversely disposed bearings 13 through which stub shafts 14 are rotatably mounted, and are connected by clutch devices 15 and 16 to the reel generally referred to by the numeral 17 and the screw shaft generally referred to by the numeral 18 respectively.

The reel 17 consists in the construction of a pair of hubs 19—19 from which radially project arms 20. The hubs are provided with stub shafts 21, one of which is disposed through the bearing 8 and connected to one of the clutch devices 15, while the other is disposed through a bearing 22 at the opposite end of the base. Elongated panels 23 connect the corresponding arms of the hub 19 and a spider 24 serves to brace the panels at their intermediate portions. As is clearly shown in Fig. 1, the bearings 8 and 22 respectively, are open at their top portions to permit the removal of the reel 17 with ease.

Bearings 25—25 are mounted on the base and support the smooth ends 26—26 of the screw 18 which is provided with reversed threads 27. The screw is disposed substantially parallel to the reel 17. A guide block 28 substantially triangularly shaped in cross section and having a hollow interior engages the screw 27. The interior recess of block 28 is provided with an arcuate surface 29 terminating in opposed semi-circular surfaces 30 and 31 at the opposite ends thereof for engaging screw shaft 27. These surfaces are provided with segments of threads upon their inner surfaces and disposed in opposite directions so as to cause movement of the block 28 in either direction as desired depending upon which of the surfaces 30 and 31 are in engagement with screw 27.

A guide bar 32 is supported horizontally beneath the screw 27 and this bar 32 has a block 33 slidable thereon and provided with ears 34—34 between which the block 28 is pivotally mounted by a pin 35. The block 33 carries a pair of outwardly projecting arms 36—36 which are secured to the block 33 by ears 37.

It will thus be seen that by securing one end of a sausage string B to a hook member 38, on the panels 23, after having disposed the same thru the arms 36—36 which are adjustable so as to allow the different sizes of sausage, the starting of the motor 12 will result in the simultaneous turning of the reel 17 and screw 18. The reel 23 will wind the sausage string thereon, while the screw 27 will feed the arms 36 longitudinally of the reel so that the sausage string will be convoluted sufficiently and in the manner shown in Fig. 6. After the sausage has been convoluted on the reel, the last end of the string is attached to a hook 39.

Crimping devices, one of which is referred to generally by the numeral 40 in Fig. 8, are employed for pinching the sausage at predetermined intervals. These crimping devices each consists of a pair of bars 41 separated by spacing bars 41' and are secured together by rivets or screws 42.

Secured to adjacent edges of the bars 41 in spaced parallel relation are elongated spring members 43—43 bent in the wave-like shape shown. These spring members are spaced sufficiently to resiliently engage the reel panels 23 therebetween in the manner shown in Fig. 7 for creasing or crimping the length of sausage into links. After the sausage has been properly crimped into links by crimping devices 40 and 17, the reel may be removed from the bearings and from the machine and placed in a smoking house.

Various changes in the specific shape, size, and materials may be resorted to in the construction of this novel machine without departing from the invention as claimed hereinafter.

Having thus described my invention, what I claim as new is:—

1. A sausage preparing apparatus comprising a base, a removable reel mounted upon the base, a screw mounted for rotation in parallelism to said reel, a sausage guide on said screw, means for rotating said reel and operating guide simultaneously, said guide being threadedly engaged on said screw, means to prevent the rotation thereof on said screw, said means consisting of a block pivotally connected to said guide, a rod, said block being provided with an opening therein to receive the rod.

2. A sausage preparing apparatus comprising a base, a removable reel mounted upon the base, a slidable sausage guide mounted upon the base, means for rotating said reel and operating guide, and a spring clamping crimping device for pinching the sausage string against the reel at predetermined intervals.

3. A sausage preparing apparatus comprising a sausage reel, means for rotating said reel, a sausage guide having means thereon for engaging a sausage and guiding it to said reel, means for moving said guide in a direction parallel to the axis of said reel in predetermined relation to rotative movements of said reel, crimping devices, and means for detachably securing said devices to said reel in position to engage said sausage between said reel and said devices at spaced intervals along the sausage to divide the same into links.

4. A sausage preparing apparatus comprising a sausage reel having a plurality of panels for engaging the sausage at spaced intervals to divide the same into lengths, means for rotating said reel, a sausage guide having means thereon for engaging a sausage and guiding it to said reel, means for moving said guide in a direction parallel to the axis of said reel in predetermined relation to rotative movements of said reel, and crimping devices arranged to engage said panels and crimp said sausage into links.

5. A sausage preparing apparatus comprising a sausage reel having a plurality of panels for engaging the sausage at spaced intervals to measure the same into lengths, means for rotating said reel, a sausage guide having means thereon for engaging a sausage and guiding it to said reel, means for moving said guide in a direction parallel to the axis of said reel in predetermined relation to rotative movements of said reel, and crimping devices arranged to engage said panels and having portions thereof arranged to engage the sausage and crimp the same into links.

6. A sausage preparing apparatus comprising a pair of supports, a sausage reel removably carried by said supports, means for rotating said reel, a sausage guide having means thereon for engaging a sausage and guiding it to said reel, means for moving said guide in a direction parallel to the axis of said reel in predetermined relation to rotative movements of said reel, crimping devices, and means for detachably securing said devices to said reel in position to engage said sausage between said reel and said devices at spaced intervals along the sausage to divide the same into links.

In testimony whereof I affix my signature.

HOMER A. EDWARDS.

CERTIFICATE OF CORRECTION.

Patent No. 1,890,249.                                           December 6, 1932.

HOMER A. EDWARDS.

It is hereby certified that error appears in the printed specification of the above numbered patent requiring correction as follows: Page 2, after line 34, insert the following paragraph –

"It will thus be seen that the present invention comprises the usual plurality of operations preparatory to smoking a length of sausage to a single machine and removable support which insures uniformity of product both as to size and preparation.";

and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.